Nov. 15, 1960 A. W. ZAVADA 2,960,074
THRUST ROLLER LINER FOR NUTATING DISC
METERS AND ASSEMBLY THEREOF
Filed Aug. 27, 1956
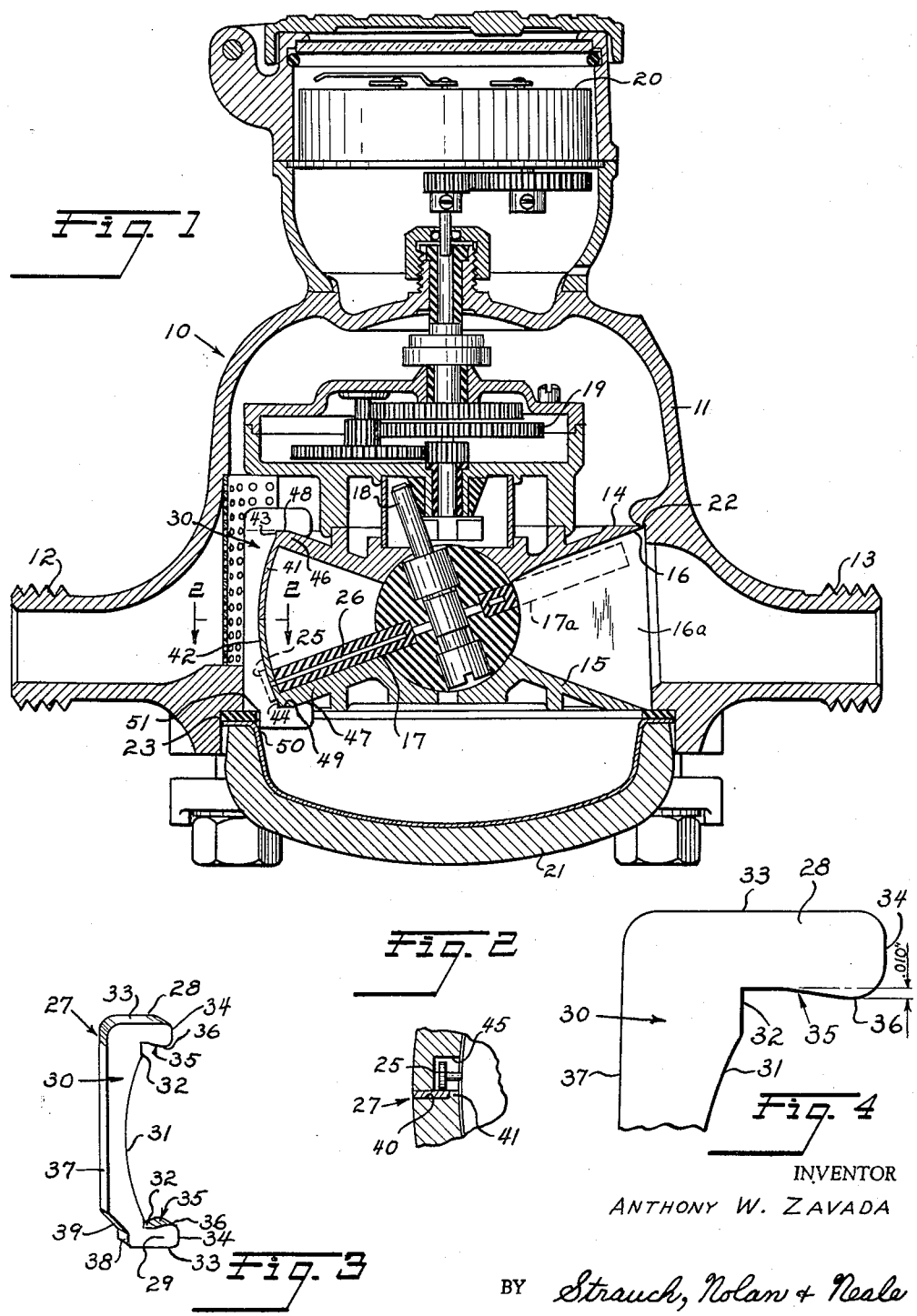
INVENTOR
ANTHONY W. ZAVADA
BY Strauch, Nolan & Neale
ATTORNEYS United States Patent Office 2,960,074
Patented Nov. 15, 1960

2,960,074

THRUST ROLLER LINER FOR NUTATING DISC METERS AND ASSEMBLY THEREOF

Anthony W. Zavada, Uniontown, Pa., assignor to Rockwell Manufacturing Company, Pittsburgh, Pa., a corporation of Pennsylvania Filed Aug. 27, 1956, Ser. No. 606,313

9 Claims. (Cl. 121—69)

This invention relates to fluid meters and the like and more particularly to improvements in thrust roller groove liners for the measuring chambers of fluid meters such as nutating disc water and like meters.

Meters of this type comprise a hollow casing having oppositely facing upper and lower complementarily shaped casing portions, a disc chamber or housing and a nutating disc received within the later. The casing construction is such that the disc chamber is held in position when the casing portions are assembled. The disc functions in well known manner to meter the fluid through nutating movement imparted by the thrust of the incoming water.

This thrust has been counteracted by a number of methods, the most common of which is the use of a thrust roller operating in cooperation with a vertically extending slot in the disc chamber or against a web in the casing, or against wear inserts removably mounted in the chamber walls. These inserts are in the nature of flat plates against which the thrust roller can bear. The inserts have the advantage of being replaceable and they also provide a cheap method of providing thrust roller bearing surfaces. Obviously an insert can be provided more cheaply than a machined slot in the casing itself. These inserts are often referred to as removable thrust roller groove liners. These inserts cooperating with the thrust roller members of meter discs have been a source of difficulty and trouble over the years. Many schemes and constructions have been developed including constructions with which it was hoped to provide trouble free wear insert structures. Further many attempts were made with a view toward reducing costs.

The prior art attempts made in an effort to provide a wholly satisfactory wear element and supporting means therefor are illustrated in the following United States patents: 535,641 to J. Thompson dated March 12, 1895; 771,337 to J. Thompson dated October 4, 1904; 884,650 to H. Frederick dated April 14, 1908; 1,857,851 to W. L. Marden dated May 10, 1932; 2,244,539 to E. N. Kruger dated June 3, 1941; 2,250,726 to H. F. Sacknus dated June 20, 1941; 2,296,491 to J. Bear et al. dated September 22, 1942; and 2,616,399 to F. W. Kohout dated November 4, 1952.

The above identified prior art patents illustrate several attempts to provide satisfactory wear elements in cooperation with thrust rollers. This art shows metal insert members inserted in slots in the meter housing, and plates formed integrally with the disc housing which cooperate with the rollers. None of them, however, have provided a snap-on element which can be snapped in position during assembly and which will not become detached yet which can be readily removed and replaced without disassembly of the disc chamber. The advantage of a construction embodying such features, such as disclosed herein, will, therefore, be obvious.

One of the objects of this invention is to provide a disc meter thrust roller groove liner which can be easily inserted and replaced.

Another object of the invention is to provide a liner or insert and supporting structure therefor which is simple in construction and thus inexpensive to manufacture.

A further object of the invention is to provide a thrust roller groove liner insert which will provide reliable performance, will be securely held in place and yet which is without complexity in both the chamber construction and the construction of the roller groove insert.

Yet another object of the invention is to provide a roller groove insert which will snap into position and be locked firmly in place.

A still further object of the invention is to provide a roller groove liner member which comprises resilient portions which will frictionally engage cooperating formations of the disc chamber so as to resiliently retain the liner element in position.

An additional object is to provide a snap-on liner element construction wherein a liner can be removed readily and a new one can be just snapped into proper place.

Yet another object of the invention is to provide in a water meter embodying a disc chamber or housing a snap-on thrust roller groove liner member which snaps over the disc chamber and can be readily removed from the disc chamber simply by withdrawing it off the housing and replaced with a new liner member simply by snapping on over the disc chamber.

Still a further object of the invention is to provide a snap-on thrust roller groove liner element and disc chamber structure as set forth above in which the snap-on liner element is backed up by the meter casing when the disc chamber and snap-on element are in place, thus further insuring proper operative relation of the parts.

Another object of the invention is to provide in nutating disc meter construction a disc chamber and a meter casing with a thrust roller groove liner member in which the liner member has end extensions extending inwardly to provide snap-on retaining means which receive therebetween portions of the disc chamber and frictionally secure the liner member to the disc chamber.

A further object is to provide apparatus as set forth above and including an inwardly opening slot in the disc chamber in which the disc roller is received and an intersecting outwardly opening slot which receives and tightly laterally engages the liner insert to provide a sealed roller thrust liner assembly.

A still further object of the invention is to provide a fluid meter including a replaceable wear element which makes it unnecessary to disassemble the disc chamber in order to replace the wear element.

It is also an object of my invention to provide a water meter construction comprising an outer casing, a disc chamber and a roller groove thrust liner frictionally engaging the exterior of the disc chamber and sealingly received in a slot in the disc chamber wherein the liner cooperates with the thrust roller and receives lateral support from the sides of the slot.

The objects of the invention also include the provision of a fluid meter construction as set forth in the preceding object in which the liner and meter casing abuttingly engage to form a backup means for ensuring that the liner remains in proper inserted position when the meter is fully assembled.

Other objects and advantages of the instant invention will become apparent from the following description when read in conjunction with the appended claims and accompanying drawings, wherein:

Figure 1 is a vertical sectional view of a water meter sectioned to indicate the interior construction of the meter casing and disc chamber and the novel snap-on roller groove liner element constructed in accordance with the present invention.

Figure 2 is an enlarged fragmentary sectional view taken along line 2—2 of Figure 1.

Figure 3 is a perspective view of the removable thrust roller groove liner on an enlarged scale.

Figure 4 is an enlarged fragmental elevational view of the liner of Figure 3.

In a preferred embodiment of the instant invention the meter 10 comprises an outer casing 11 having inlet and outlet pipe connections 12 and 13 and an open bottom wall.

A disc chamber or housing 14 composed conventionally of upper and lower chamber sections disposed in outer casing 11 provides the well known frusto-conical chamber walls 15 and 16 having a side opening and the customary division plate 16a separating the side opening into inlet and outlet ports and forming a division wall adjacent the inlet and outlet ports to conventionally convert the chamber into passage means connecting the ports. A nutating disc 17 operates within chamber 14 between surfaces 15 and 16 in well known manner to divide the aforesaid passage means into alternately connectable upper and lower passages as disc 17 undergoes nutating movement as a result of passage of fluid through the passage means from the inlet port to the outlet port. The disc 17 is provided with the usual drive spindle 18 which cooperates with the gear train 19 to drive meter recorders 20 and the usual radial slot 17a receiving division plate 16a. Also, casing 11 includes a separable bottom member 21 known as a frost plate and designed to rupture upon freezing of the water to protect the other meter parts from damage. The disc chamber 14 is retained within casing 11 by separable member 21, the disc chamber being urged against flange 22 on the casing by member 21 as the latter is drawn into sealing engagement with gasket 23 by bolts 24. The same disc chamber 14 is used in meters employing a two part outer casing 11 designed for use in temperate climates where frost plate 21 is not required. In such meters, the disc chamber is clamped between opposed shoulders provided by complementary recesses formed in the two meter halves.

The disc 17 is provided with a thrust roller 25 having a shank 26 journalled in the disc. This roller is of the usual type and is adapted to cooperate with the wear plate member or thrust plate 27 which is generally referred to as a roller groove liner. Thrust roller liner 27 and its cooperating structure on the casing 11 and chamber 14 are the elements to which this invention is directed.

Thrust liner 27 is, as illustrated in Figure 3, preferably formed of relatively thin flat sheet material which can be stamped to the configuration illustrated. Preferably this member is formed of a corrosion resistant resilient material having good wearing qualities. Stainless steel or even non-metallic synthetics can be used for example. The thrust liner has upper and lower ears 28 and 29 connected by a vertically extending web 30. Web 30 is provided with a curved edge resulting in a reduced cross section adjacent its middle as indicated at 31.

Each of the ears 28 and 29 are formed in the same manner and thus only one of these ears will be described. Referring to ear 29, it is seen that this projects outwardly from a flat vertical shoulder 32 extending from the lower extremity of curved portion 31 to the ear. The lower edge surface 33 of the ear is flat and extends laterally of the web 30. Ear 29 presents a relatively rounded end face 34 connected to the lower edge 33 preferably on a curve. The inner edge or upper surface 35 of ear 29 extends outwardly from shoulder 32 substantially horizontally for a distance approximately a third the total length of the distance from shoulder 32 to face 34. At this point the upper surface slopes inwardly gradually toward end face 34 to the extent that a raised portion is formed above the inner upper face 35. The apex of this raised portion is indicated at 36. From the apex outwardly the upper face curves downwardly and merges into end face 34. The raised portion may be formed by a single curve or may be complexly curved or may be formed by straight lines as desired. The result is that the distance between the apex 36 of the upper ear 28 and the lower ear 29 is shorter than the distance between the inner portions of the upper face 35 of the lower ear 29 and the lower face 35 of the upper ear 28.

The rear wall or edge 37 of the thrust liner merges with the upper surface 33 of the upper ear 28 with a short convex curve. However, the lower surface 33 of ear 29 first merges with a vertically extending wall 38 which in turn merges with a sloping angled wall 39. The latter connects to rear wall 37 at a sharp corner provided at the mergence of walls 37 and 39.

The disc chamber is provided with a slot 40 extending inwardly from the outer wall to a predetermined depth thereby providing a thin wall section 41 forming the base of the slot. Wall 41 has a peripheral surface 42 complementary to curved surface 31 terminating at its upper and lower ends respectively in vertically disposed wall sections 43 and 44 defining the ends of the bottom wall of slot 40.

Immediately adjacent slot 40 and intersecting one face thereof, disc chamber 14 is provided with an inwardly opening roller receiving groove 45. The depth of groove 45 is such that a thin outer wall section is left outwardly of the roller groove 45. Preferably the distance between the edge of this wall section and the opposed wall of slot 40 is equal to the thickness of roller thrust insert 27 so that a forced fit between the opposed walls and insert 27 is effected upon insertion of the insert to seal the chamber at opposite sides of the insert.

The thrust roller liner 27 is formed of a resilient material and the normal vertical distance between the inner surfaces or faces of the ears at the apexes 36 is less than the vertical distance between the upper and lower end walls 46 and 47 of the disc chamber which slope downwardly and inwardly toward the central portions of the walls from annular planar rims 48 and 49. Each of walls 46 and 47 provides a central portion formed with a hemispherical recess for reception of the upper and lower spherical nutating disc body portion in well known manner. As a result ears 28 and 29 must be bowed outwardly with respect to each other with consequent deflection of the necked down central portion of web 31 in order to properly seat the thrust roller liner in slot 40 of the disc chamber.

The upper and lower disc chamber walls 46 and 47 are defined in part by annular rims 48 and 49. The distance between the apexes 36 on the liner is slightly less than the vertical distance between rims 48, 49 of walls 46 and 47 of the disc chamber in the preferred embodiment. Thus the sloping surfaces 35 between apexes 36 and shoulders 32 will bear on these sloping chamber walls and resiliently cam the liner inwardly firmly against the complementarily formed surfaces 42, 43 and 44 of wall section 41 of casing 11. Further, it is apparent that the distance between the shoulders 32 on the liner, which mate with the vertical surfaces 43, 44 on chamber 14, and the apexes 36 is slightly greater than the width of rims 48—49 of chamber end wall ribs 46 and 47.

From the foregoing description, it is apparent that the roller liner is sealingly positioned in slot 40 with ears 28 and 29 frictionally and resiliently engaged with walls 46 and 47 respectively, with the apexes 36 snapped over the rims 48 and 49, and with the curved wall 31 in abutting relationship with the curved chamber wall surface 42 and contacting the latter. Due to deflection, the thrust roller liner is stressed and this causes the ears to frictionally retain the liner in position. The sloping characteristics of the ears coupled with the forced fit in slot 40 and the resiliency results in a tendency to firmly and sealingly seat the liner. The curved corner surfaces on the ears 28 and 29 also facilitate placing of the roller liner in the disc chamber or removal therefrom.

Referring now to Figure 1, it is seen that the disc chamber 14 and the annular receiving cavity 51 of meter housing 11 and the thrust roller groove liner are so dimensioned that when assembled the rear wall 37 will bear directly on the vertical wall of cavity 51 thus ensuring that the roller liner is retained in position at all times and cannot be removed until the meter is disassembled. The sloping wall 39 is seen to be provided in order to avoid interference with gasket 23 and bottom casing member 21 and is obviously not an essential element of the invention. The thrust roller 25 operates in contact with one side of the liner 27 through the intersecting portions of slots 40 and 45 in known manner. Since the flow of fluid through the meter is in one direction only the thrust on the disc 17 is always in one direction. Consequently, the roller 25, which projects into groove 45 with clearance, will always bear up against that side wall of groove 45 of which the insert 30 is a part.

From the above it is seen that I have provided a snap-on thrust roller groove liner which, when the disc chamber is disassembled from the casing 11, can be snapped in place and retained in assembled relation and still be simply and easily removed by pressure on the ends of ears 28 and 29. One distinct advantage of such construction is that when the disc chamber is assembled the liner 27 can be positively maintained in position by virtue of the nature of the structural relationship of the elements involved and no auxiliary means are needed to retain the position of these elements while the disc chamber is being inserted in the meter casing. Furthermore, displacement of the liner cannot occur in use due to the backing afforded by the wall of casing cavity 51 and the annoying disassociation of the elements which may be experienced during assembly with other constructions will not be experienced. Assembly and disassembly of the disc chamber itself and the disc chamber from casing 11 is thus greatly facilitated.

Further the disc chamber need not be disassembled to replace the thrust liner. The liner is simply "snapped" or pulled off or out and a new liner pushed or pressed into place. This of course results in a considerable saving in maintenance costs.

The roller liner as described above is formed of a resilient material such as stainless steel, a suitable plastic, or any other similar suitable material in order to insure corrosion resistance.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination a fluid meter casing being formed with inlet and outlet ports and a cavity for receiving a nutating disc measuring chamber; a nutating disc measuring chamber comprising upper and lower chamber sections providing end walls and a disc chamber wall formed with a side opening, a radially disposed division plate dividing the side opening into inlet and outlet ports, a radially slotted nutating disc receiving said division plate in the slot and a thrust roller mounted on a radial axis extending from the disc periphery at a point diametrically opposite said radial slot, said chamber wall also being formed with a roller groove in its inner face in position to receive said thrust roller and extending the full inner height of said chamber wall and of a depth less than the thickness of said chamber wall and a thrust liner slot in its chamber wall outer face adjacent said roller groove with one side intersecting a side of said roller groove and extending from the outer face of said chamber wall inwardly a distance less than the thickness of said chamber wall; and a plate-like thrust liner of a thickness to snugly fit in said thrust liner slot and provided at its opposite ends with radially directed securing ears adapted to overlie and frictionally cooperate with the measuring chamber end walls to retain said thrust liner in said thrust liner slot with one side face exposed through the intersecting portions of said groove and slot to provide a roller engaging surface to guide said roller in its movements along said roller groove as said disc nutates under influence of the fluid passing through the measuring chamber and its outer edge disposed to engage a portion of the interior wall of said fluid meter casing cavity to aid said securing ears in preventing disassociation of said thrust liner once said measuring chamber is assembled in said fluid meter casing.

2. The combination defined in claim 1 wherein said thrust liner extends slightly beyond the outer face of said chamber wall and provides a planar edge face adapted to abuttingly engage a portion of the annular wall of said casing cavity thereby positively retaining said thrust liner against accidental displacement from said thrust liner slot during operation of said meter.

3. A water meter disc chamber comprising upper and lower chamber sections having respective side walls and end walls, said side walls being formed with respective oppositely opening pairs of axial slots having a common medial side, one of each of said pairs of slots opening into said chamber and cooperating to form a roller receiving groove and the other of said pairs of slots opening through the external side and end walls of said chamber sections and cooperating to form a roller thrust liner insert slot; a division plate disposed along a radial axis of said chamber diametrically opposite the axis of said roller groove, said division plate effectively bisecting a chamber sidewall opening disposed diametrically opposite said roller groove to define adjacently related inlet and outlet ports and dividing said chamber along said radial axis to convert said chamber into passage means interconnecting said ports; a radially slotted nutating disc mounted between said chamber sections with its radial slot receiving said division plate and carrying a peripherally protruding thrust roller extending into the roller receiving groove; and a thrust roller liner disposed in the roller thrust liner insert slot with one face forming the roller groove wall along said common medial side and its opposite ends extending beyond the end walls of said respective chamber sections and formed to provide resilient attachment ears to frictionally engage said chamber end walls and thereby secure said thrust roller liner in place.

4. In combination with a water meter disc chamber comprising upper and lower housing members having end walls and a side wall formed with a through opening, an axially directed thrust roller groove in its inner face diametrically opposite said side wall opening and an axially directed slot in its outer face located so one side wall coincides with a side wall of said roller groove, a disc mounted in said housing for nutating movement, a thrust roller mounted on the periphery of and extending radially from the periphery of said disc into said thrust roller groove: a thrust roller groove liner formed of a resilient material disposed in said slot and having radially inwardly directed ears at its opposite ends arranged to overhang and frictionally engage the opposite end faces of said housing members, the distance between said liner ears prior to assembly in said chamber wall slot being less than the distance between the end faces of said housing members whereby said liner ears are effective to resiliently grip said housing end faces and retain said liner in said wall slot with one face exposed through the radially disposed opening provided by the groove and slot to rollingly support said roller.

5. The combination defined in claim 4 wherein said housing member end walls are provided with upstanding annularly extending rims the inner edges of which are located a predetermined radial distance inwardly of the end wall periphery and wherein said radially directed ears are formed with inner opposed faces provided at their free ends with inwardly directed protuberances adapted to cammingly engage said rims upon movement of said insert radially into said insert slot and spread said ears apart thereby tensioning said ears and conditioning them to resiliently, cammingly engage the opposed edges of said protuberances with said inner rim edges of said annularly extending rims to draw said insert into said slot and resiliently retain said thrust roller insert in assembled relation.

6. In combination with a nutating disc measuring chamber being formed with end walls and a sidewall defining a disc chamber, a side opening, a centered spherical disc mounting recess, a roller receiving groove in the inner face of said chamber sidewall diametrically opposite said side opening and a thrust roller liner slot adjacent said roller groove in the outer face of said chamber sidewall disposed so that one of its sides lies in the radial plane of one side of said roller groove and intersects said one side of said roller groove and a nutating disc having a centered spherical mounting hub mounted in said centered spherical disc mounting recess and a thrust roller connected to said disc and disposed in said roller groove outwardly from the periphery of said disc journalled on an axis intersecting the center of said mounting hub: a thrust roller liner comprising a plate-like member disposed in said liner slot with one face engaging said thrust roller through the opening formed by the intersecting sides of said roller groove and liner slot, said liner having a thickness to seal said slot and ends overhanging and frictionally engaging the chamber end walls to frictionally retain said liner in fixed assembled relation with respect to said chamber.

7. A disc meter thrust roller groove liner comprising a planar web of axially elongated configuration having one straight longitudinal edge provided at one end with a notched corner recess and an opposite longitudinal edge symmetrically concavely curved in a longitudinal direction between a pair of aligned, longitudinally extending abutment shoulder sections and having a pair of laterally extending ears protruding respectively from said other web edge, one at the outer end of each of said abutment shoulder sections, and providing opposed inner gripping edge surfaces consisting of respective opposed laterally extending sections immediately adjacent said web edge abutment shoulder sections, respective opposed convergingly inclined sections extending laterally outwardly from said laterally extending sections and respectively opposed convexly rounded terminal corner portions forming camming surfaces adapted to engage the disc chamber end walls and cam said ears apart upon lateral assembly of said liner with a meter disc chamber to tension said ears for frictional gripping engagement with said disc chamber end walls when finally assembled therewith.

8. In combination, a water meter disc chamber made up of upper and lower chamber halves having respective end walls forming an annular planar faced rim and an immediately adjacent axially inwardly sloping wall portion and respective interfitting side walls defining an annular disc chamber, said respective side walls being axially grooved at predetermined points on their inner and outer faces to form when assembled an internal axially directed roller groove and an external axially directed insert receiving slot having adjacent side walls lying in a common radial plane and in part overlapping one another thereby establishing a communication opening therebetween in the area of coincidence of said groove and slot side walls; a disc mounted in said chamber for nutating movement and dividing said disc chamber into upper and lower fluid chambers; a thrust roller connected to said disc at a point on its periphery for rotation around a radial axis lying within the body of said disc; and a thrust roller liner of planar form comprising a body disposed in said insert receiving slot with one face lying in said common plane in position to be engaged by said roller through said communication opening and securing ears integrally formed on the ends of said body extending axially beyond the ends of said insert slot and laterally from the same edge of said body, said ears each having opposing inner faces provided at their free ends with inwardly directed rounded protuberances spaced apart a distance less than that of the sloping end wall portions adjacent said annular rims of said assembled disc chamber sections whereby, upon entry of said liner into said insert slot with said ears overlying the chamber end walls, said protuberances will engage with said end wall annular rims and said adjacent sloping end wall portions thereby spreading said ears apart and tensioning the ears to effect a bearing engagement of said protuberances on said sloping end wall portions, a resilient biasing of said liner into said slot and an interlock of said ears behind said end wall rims to retain said liner in place.

9. The combination of claim 8 wherein said opposing inner faces of said ears inwardly from said protuberances and adjacent said liner body have laterally extending portions spaced apart a distance substantially equal to the spacing between the planar faces of said chamber end wall rims and merging at points laterally spaced from said liner body a distance approximately equal to the width of said chamber end wall rims into inwardly sloping portions tangentially intersecting said rounded protuberances.

References Cited in the file of this patent

UNITED STATES PATENTS

| 618,192 | Thomson | Jan. 24, 1899 |
| 884,650 | Frederick | Apr. 14, 1908 |
| 1,857,851 | Marden | May 10, 1932 |